United States Patent [19]

Roeschlein

[11] Patent Number: 4,521,961

[45] Date of Patent: Jun. 11, 1985

[54] METHOD FOR THE MANUFACTURE OF A MULTI-POLAR CONTACT STRIP

[75] Inventor: Rolf Roeschlein, Paderborn, Fed. Rep. of Germany

[73] Assignee: Nixdorf Computer AG, Fed. Rep. of Germany

[21] Appl. No.: 430,550

[22] Filed: Sep. 30, 1982

[30] Foreign Application Priority Data

Apr. 20, 1982 [DE] Fed. Rep. of Germany ....... 3214532

[51] Int. Cl.³ ............................................ B23P 15/00

[52] U.S. Cl. ........................................ 29/884; 29/874

[58] Field of Search ................. 29/564.1, 564.6, 566.2, 29/742, 739, 884, 874, 33 S, 33 M, 592 R

[56] References Cited

U.S. PATENT DOCUMENTS

| | | | |
|---|---|---|---|
| 3,702,104 | 11/1972 | Brubaker | 29/874 |
| 3,769,679 | 11/1973 | Kendall | 29/739 X |
| 3,805,356 | 4/1974 | Serrano | 29/739 X |
| 4,018,177 | 4/1977 | McKee et al. | 29/874 |
| 4,125,935 | 11/1978 | Ammon | 29/739 X |
| 4,177,554 | 12/1979 | Deveres et al. | 25/566.2 X |
| 4,296,550 | 10/1981 | Kobler | 29/884 |
| 4,330,168 | 5/1982 | Arnold | 29/874 |
| 4,333,213 | 6/1982 | Meal et al. | 29/564.6 X |
| 4,393,581 | 7/1983 | Cherian | 29/874 X |

FOREIGN PATENT DOCUMENTS

| | | | |
|---|---|---|---|
| 2917110 | 10/1980 | Fed. Rep. of Germany | 29/874 |
| 122792 | 10/1978 | Japan | 29/874 |
| 562027 | 7/1977 | U.S.S.R. | 29/874 |

*Primary Examiner*—William R. Briggs
*Attorney, Agent, or Firm*—Krass & Young

[57] ABSTRACT

Process for producing a multipolar multipoint connector (terminal strip) with a plurality of contact prongs arranged one beside another on a plastic carrier or the like. For this all of the contact prongs still joined together by webs are assembled on the carrier in one operating step and only then are cut apart (or separated) from one another. An improved carrier as well as a better assembling (or mounting) ensure a form-locking joining of the contact prongs with the carrier. Besides this, a process for providing the new multipoint connector is supplied.

5 Claims, 5 Drawing Figures

METHOD FOR THE MANUFACTURE OF A MULTI-POLAR CONTACT STRIP

INTRODUCTION AND BACKGROUND

The invention relates to a process for producing a multipolar multipoint connector (terminal strip) with a plurality of metal contact prongs arranged one beside another, with their first end bent around the front edge of a carrier, with their second end projecting out over the rear edge of the carrier, where the first ends of the contact prongs bent backward are accommodated in pockets formed on the bottom side of the carrier, and the parts of the contact prongs situated on the top side of the carrier are accommodated in receptacles formed on the top side of the carrier, and where the ends projecting over the rear edge of the carrier are bent down as soldering lugs or the like. The invention also relates to a multipoint connector produced by this processor as well as a device for carrying out this process.

This kind of multipoint connectors are found in various standardized designs and sizes and they serve for connecting various electrical connections with electrical appliances.

A process of the type mentioned at the start is already known in which all of the contact prongs are fabricated singly and assembled on the carrier. The contact prongs are cut out of a strip material and their first end is bent back. Then the contact prongs are individually slipped onto the carrier and mounted (or threaded into) the receptacles for the first end as well as the part situated on the top side of the carrier. After the contact prongs are assembled the ends projecting above the rear edge of the carrier are bent down as soldering lugs.

This process is very expensive and time comsuming and therefore costly. Besides this, the multipoint connectors produced by this process have the disadvantage that the contact prongs are fixed on the carrier only by friction tightness. This often leads to the individual contact prongs coming loose from the carrier.

SUMMARY OF THE INVENTION

It is the problem of the present invention to improve a process of the type mentioned at the start in such a way that the fabrication is simpler, more rapid and therefore cheaper. Besides this there is the problem of improving the multipoint connector itself as compared with the known multipoint connectors, and in particular to prevent any coming loose of the individual contact prongs from the carrier, reliably, by means of a form-locking fastening to the latter.

This problem is solved according to the invention by a process with the operating steps mentioned in the characterizing part of claim 1. The invention makes use of the knowledge that the same operating steps required for the fabrication as well as the assembling of each individual contact prong can be combined if the contact prongs required for a multipoint connector are combined in one structural part. The contact prongs joined together by the webs are bent forward as a whole, slipped onto the carrier and bent into their finished form as a whole. The required punching operation for separating the contact prongs can be combined directly with the finishing bending operation. The additional bending operation, in which the end projecting above the rear edge of the carrier is bent downward at right angles somewhat in the shape of stairs, serves for the improved form-locking fastening of the contact prongs onto the carrier.

According to one feature of the invention the contact prongs are punched out as a continuous strip and the first ends are bent back. Then with the addition of a spacer strip, the strip is wound up. The spacer strip prevents the bent-back ends from being warped out of shape. A gold plating of the contact prongs, if necessary comes after the punching operation and the first bending operation, so that the punched edges are also gold plated.

In a modification of the process described it is provided that the latter two operating steps, namely the step-like bending at right angles, the cutting apart of the contact prongs and also the bending back of the soldering lugs are combined in one operation.

The multipoint connector fabricated by the process according to the invention is characterized in that on the top side of the carrier, in the space remaining between two contact prongs, approximately hook-shaped receptacles with a base and a projection projecting laterally from it are arranged, and that on the part of the contact prongs resting on the top side of the carrier are arranged laterally projecting lugs which grip under the projections when the contact prongs are slipped on. Since the contact prongs during their assembly are still joined with webs, it is not possible to push these through individual passages formed in the multipoint connector as with the known multipoint connectors. In the multipoint connector according to the invention, rather, the parts of the contact prongs located on the top side of the carrier are pushed between these hooked-shaped receptacles, wherewith the webs slide away over these hooks and snap downward behind these due to the elastic initial stress of the multipoint connectors. Thereby the contact prongs come to lie between the hook-shaped carriers. By pushing the contact prongs further, the lugs formed on these grip under the projections of the hook-shaped receptacles so that they are secured against lifting and against lateral movement.

In order to facilitate the sliding of the webs over the hook-shaped receptacles, there are shoulders rising in ramp fashion placed before these. These have substantially the same width as the bases of the hook-shaped receptacles, so that space remains between these for the contact prongs with their lateral lugs.

For carrying out the process according to the invention a device is proposed corresponding to the characterizing part of claim 8.

Further advantages and features are found from the claims as well as from the following description.

An embodiment of the invention is represented in the drawings and described in detail in the following.

DETAILED DESCRIPTION OF ILLUSTRATIVE EMBODIMENTS

Figure 1:
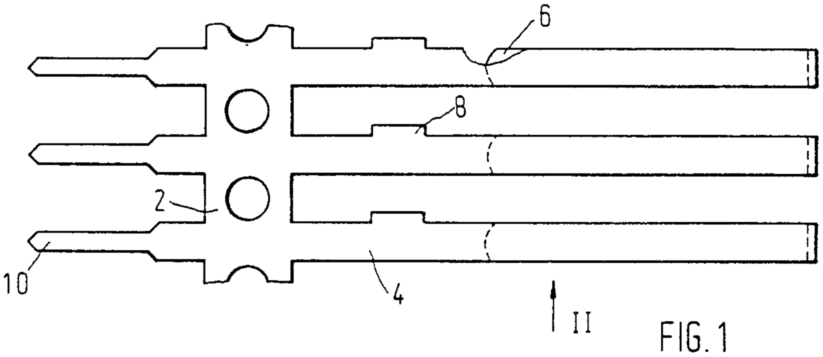
FIG. 1 shows a segment of a pounded-out strip including three contact prongs.
Figure 2:
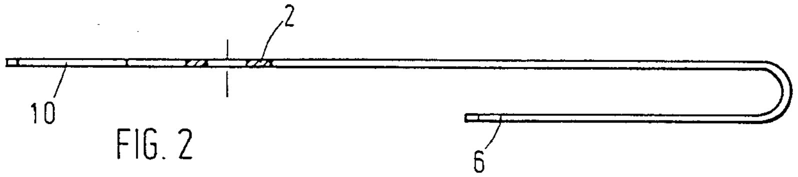
FIG. 2 shows a view of the strip according to FIG. 1 in the direction of the arrow II.

FIG. 1 shows a plurality of contact prongs 4 connected together by webs 2, which prongs are punched out of metal strip. For purposes of punching with minimum waste, the capability exists of punching out two interlocking contact prong strips out of one metal strip at the same time. As FIG. 2 in particular shows, the first ends 6 are bent downward in approximately a hook-shape. Lateral lugs 8 are formed on the respective contact prongs, the function of which will be described later. The second ends 10 provided as soldering lugs have a smaller width than the contact prongs 4.

Figure 3:
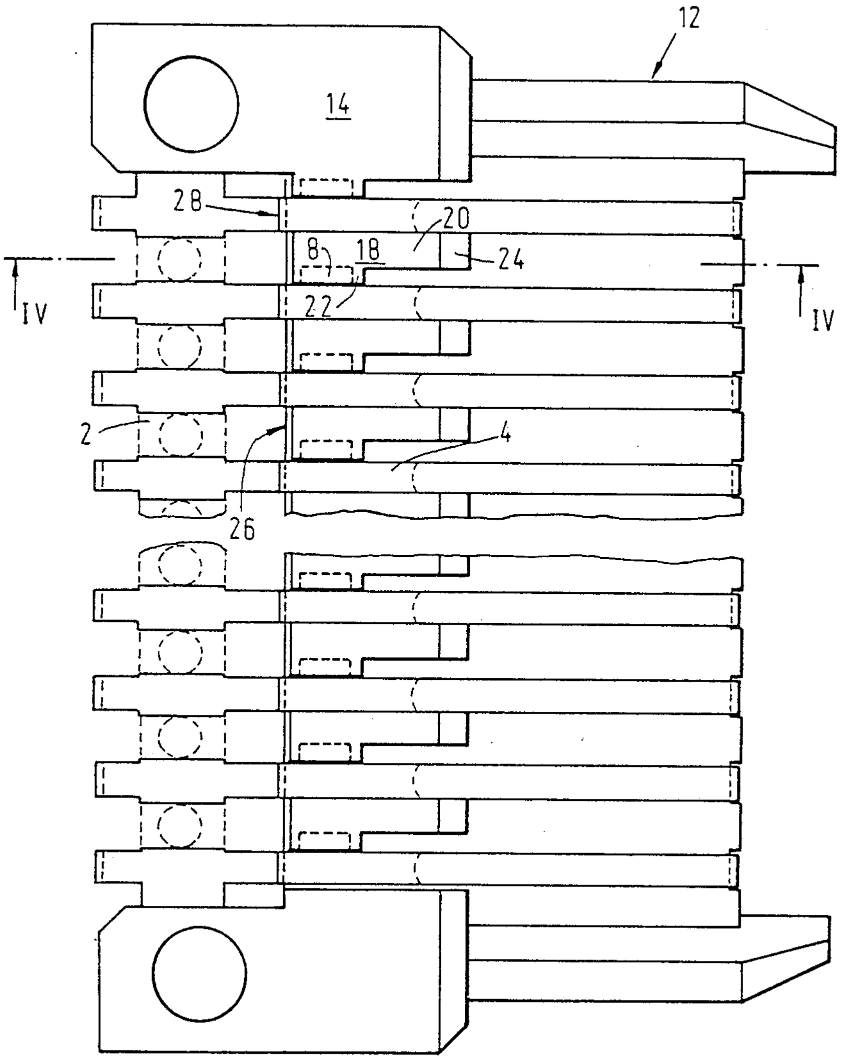
FIG. 3 shows a top plan view of a partly cutaway carrier with assembled contact prongs.

FIG. 3 shows a carrier 12 in a view from above of the top side. The shaped parts 14 arranged on the carriers 12 serve for an exact positioning and retaining of the carriers on the appliances in which they are to be inserted. They also serve for mounting the carriers on the devices in which the contact prongs are assembled.

Figure 4:
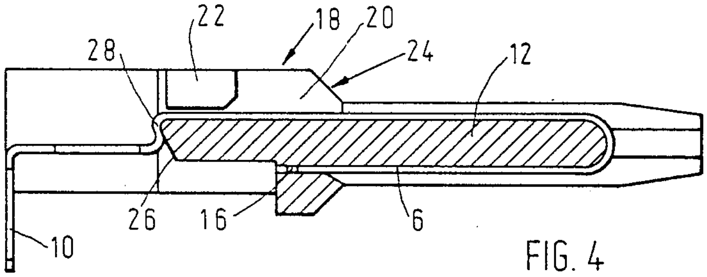
FIG. 4 shows a section through the carrier represented in FIG. 3 along the line IV—IV.

As can be seen especially in FIG. 4 also, the contact prongs are slipped onto the carrier 12 in such a way that the first ends 6 bent downward lie on the bottom side of the carrier. They grip on the pockets 16 formed on the bottom side of the carrier and are fixed by these. The contact prongs lie with their part which is arranged on the top side of the carrier 12 respectively situated between hook-shaped receptacles 18 which are substantially formed by a base 20 standing vertically on the carrier 12 and a projection 22 projecting laterally from it. When the contact prongs are pushed in, the lugs 8 respectively grip under the projections 22 assigned to them, so that the contact prongs are fixed laterally and against lifting.

When the contact prongs are slipped onto the carrier 12, the webs 2 must respectively slide over the receptacles 18, as FIG. 3 makes clear. In order to facilitate this operation, the receptacles 18 each have approximately ramp-shaped ascending shoulders 24 placed before them which raise the webs 2 against the spring-like force of the contact prongs. When the contact prongs are slipped onto the carrier 12 far enough that the webs 2 are located behind the rear edge 26 of the carrier 12, the contact prongs 4 can snap downward elastically (or like a spring) since the lugs 8 are then still in front of the projections 22 as seen in the slipping-on direction. Only with a further slipping of the contact prongs onto the carrier 12 do the lugs 8 grip under the projections 22, as already described.

The end of the contact prongs projecting above the rear edge 26 are bent down at right angles somewhat like stairs in the region 28, so that they are secured by form locking against slipping off the carrier 12, as is shown in FIG. 4 especially. The ends 10 are bent downward approximately at a right angle as soldering lugs.

Figure 5:
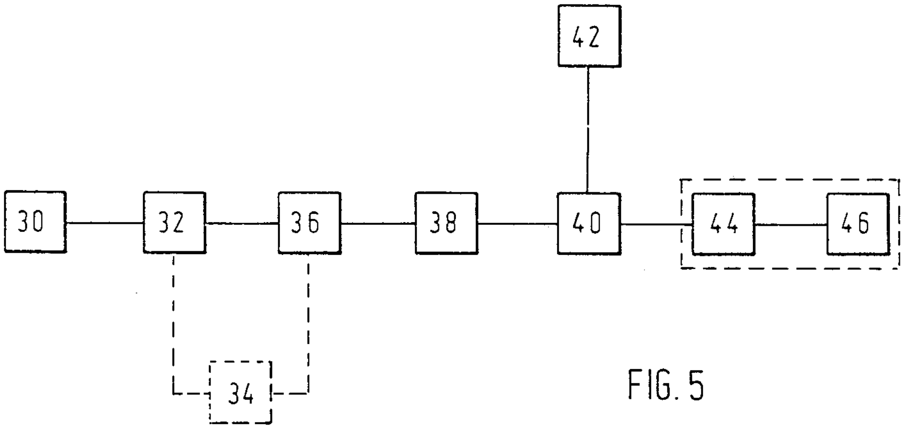
FIG. 5 diagrammatically shows a device for fabricating the contact prongs.

FIG. 5 diagrammatically shows the structure of a device for fabricating multipoint connectors. In a punching unit 30, contact prong strips are punched out of metal strips, preferably of tin bronze. In a bending unit 32 the first ends 6 are bent down. The contact prong strips thus first prepared can then move onto an electroplating station 34 for the gold plating or if necessary be sent directly into a coiling unit 36 where they are coiled up in the manner described. For further processing the contact prong strips are uncoiled from the coiling unit and cut to length in a cutting unit 38. In an assembling station 40 the contact prongs meet with the carrier which are conveyed from a station 42. After the contact prongs are slipped onto the carrier in the station 40, the contact prongs are bent at right angles in a bending station 44 and in a further punching and bending station 46 the webs are punched out and the soldering lugs are bent down. As is seen from FIG. 5, the two latter stations can be combined into one common station.

I claim:

1. Process of producing a multipolar multipoint connector with a plurality of metal contact prongs arranged one beside another, with their first ends bent around the front edge of a carrier, with their second ends projecting out over the rear edge of the carrier, where the first ends of the contact prongs bent backward are accommodated in pockets formed on the bottom side of the carrier, and the parts of the contact prongs situated on the top side of the carrier are accommodated in receptacles formed on the top side of the carrier, and where the second ends projecting over the rear edge of the carrier are bent down as soldering lugs or the like, characterized by the following process steps:
   - (a) the contact prongs (4) are punched out of a raw material as a strip cohering through webs (2), where the prongs remain joined together by webs (2) situated in the region projecting over the rear edge (26) of the carrier (12);
   - (b) the first ends (6) are bent back in common;
   - (c) the contact prongs (4) are jointly slipped onto the carrier (12), where their bent-back first ends (6) engage in assigned pockets (16), and the parts of the contact prongs (4) situated on the top side of the carrier (12) grip by their laterally projecting lugs (8) under assigned projections (22);
   - (d) the ends (10) projecting over the rear edge (26) are bent at a right angle around the rear edge (26) somewhat in the shape of stairs;
   - (e) the webs (2) are punched out and the second ends (10) are bent down.

2. Process as claimed in claim 1, characterized in that the contact prongs (4) are punched out as a continuous strip and this is wound up after the bending back of the first ends (6) situated around the front edge of the carrier (12), and that the respective length required for fabricating the contact strip is cut off.

3. Process as claimed in claim 2, characterized in that the strip is wound up with a spacer strip arranged on the side of the bent-back first end (6).

4. Process as claimed in claim 1, characterized in that the strip is gold plated in the region of the bent-back first ends (6).

5. Process as claimed in claim 1, characterized in that the operating steps (d) and (e) are combined into one operating step.

* * * * *